US012240557B2

(12) United States Patent
Wang

(10) Patent No.: US 12,240,557 B2
(45) Date of Patent: Mar. 4, 2025

(54) DRAW-BAR BOX-TYPE QUICKLY FOLDING MICRO ELECTRIC VEHICLE

(71) Applicant: SunTech UK Limited, Redhill (GB)

(72) Inventor: Jianmin Wang, Beijing (CN)

(73) Assignee: SUNTECH UK LTD, Redhill (GB)

( * ) Notice: Subject to any disclaimer, the term of this patent is extended or adjusted under 35 U.S.C. 154(b) by 887 days.

(21) Appl. No.: 17/284,567

(22) PCT Filed: Oct. 8, 2019

(86) PCT No.: PCT/CN2019/109916
§ 371 (c)(1),
(2) Date: Apr. 12, 2021

(87) PCT Pub. No.: WO2020/078226
PCT Pub. Date: Apr. 23, 2020

(65) Prior Publication Data
US 2021/0331764 A1  Oct. 28, 2021

(30) Foreign Application Priority Data
Oct. 15, 2018 (CN) .......................... 201811197522.X

(51) Int. Cl.
B62K 15/00 (2006.01)
B60L 50/60 (2019.01)
B62D 61/08 (2006.01)
B62K 5/025 (2013.01)

(52) U.S. Cl.
CPC ............ B62K 15/008 (2013.01); B60L 50/66 (2019.02); B62D 61/08 (2013.01); B62K 5/025 (2013.01)

(58) Field of Classification Search
CPC ................................ B62D 61/08; B62K 5/025
See application file for complete search history.

(56) References Cited

FOREIGN PATENT DOCUMENTS

| CN | 202518420 U | * | 11/2012 | |
|----|-------------|---|---------|------|
| EP | 2623407 A1  | * | 8/2013  | ........... B62K 15/008 |
| FR | 2821050 A1  | * | 8/2002  | ................ B62J 1/28 |

* cited by examiner

Primary Examiner — Jacob D Knutson
(74) Attorney, Agent, or Firm — Thibault Patent Group

(57) ABSTRACT

Disclosed is a draw-bar box-type quickly folding micro electric vehicle, comprising of a seat frame assembly (1) that is horizontally arranged, the top surface of which is provided with a foldable backrest. A pair of symmetrically arranged rear wheel assemblies (2) are arranged at a position, close to a rear of the vehicle, on the bottom surface of the seat frame assembly (1), and two vertically downward first connecting posts (101), which are provided near the front of the lower end of the seat frame assembly (1). A footrest assembly (4) is hinged to the lower ends of the two first connecting posts (101) through the first connecting assemblies (3). The footrest assembly (4) is arranged parallel to the seat frame assembly (1), and the plane of the footrest assembly (4) is lower than the plane of the seat frame assembly (1). A steering column assembly (5) is hinged at the end of the footrest assembly (4) away from the seat frame assembly (1), and a front wheel assembly (6), with a power device, is attached at the lower end of the steering column assembly (5). A very low footrest assembly (4) is hinged to the seta frame assembly (1) by means of the first connecting assembly (3), so that the user does not need to raise their legs to use the vehicle. Thus, use of the vehicle is convenient and safety risks are reduced.

9 Claims, 9 Drawing Sheets

… (1) …

DRAW-BAR BOX-TYPE QUICKLY FOLDING MICRO ELECTRIC VEHICLE

CROSS-REFERENCE TO RELATED APPLICATIONS

This application is a national stage application, filed under 35 U.S.C. § 371, of International Patent Application No. PCT/CN2019/109916, filed on Oct. 8, 2019, which is an International Patent Application of Chinese Patent Application No. 201811197522.X, filed on Oct. 15, 2018.

TECHNICAL FIELD

The present invention belongs to the field of mobility tools, and further relates to a foldable electric vehicle, and, more particularly, a draw-bar box-type quickly folding micro electric vehicle.

BACKGROUND

The inventor applied for a patent number CN103204209B in 2013 and disclosed a draw-bar box type portable folding electro-tricycle with a folding chair function. The tricycle's electric front wheel and the controlling handlebar can be stored within the seat case by using the foldable frame, which rotates under the frame base, and then, through other auxiliary structures, it can be converted in three states: electric tricycle, trolley suitcase and chair.

However, in use, the above was found to have the following defects: the main connecting part is folded with the controlling handlebar and the electric front wheel above and below the folding frame respectively; in order to ensure that the electric front wheel and the controlling handlebar can be stored in the seat case under the frame base, the folding frame has a certain height from the ground, so that, when using the electric tricycle, users must lift their legs across the folding frame to sit on the seat frame base; during the driving process, the user's feet can only be placed on the footrests on both sides of the front wheel. For disabled users who are older or have less mobile lower bodies, not only is it inconvenient to use, but there are also potential safety risks.

SUMMARY

In order to solve the above problems, the present invention provides a draw-bar box-type quickly folding micro electric vehicle that does not require the user's legs to be raised high during use and is more convenient to operate and guarantees the safety of the user. The specific solutions are as follows:

The draw-bar box-type quickly folding micro electric vehicle function includes: a seat frame assembly that is horizontally arranged, the top surface of which is provided with a foldable backrest. A pair of symmetrically arranged rear wheel assemblies are arranged at a position, close to a rear of the vehicle, on the bottom surface of the seat frame assembly, and two vertically downward first connecting posts, which are provided near the front of the lower end of the seat frame assembly. A footrest assembly is hinged to the lower ends of the two first connecting posts through the first connecting assemblies. The footrest assembly is arranged parallel to the seat frame assembly, and the plane of the footrest assembly is lower than the plane of the seat frame assembly. A steering column assembly is hinged at the end of the footrest assembly away from the seat frame assembly, and a front wheel assembly, with a power device, is attached at the lower end of the steering column assembly.

Additionally, the first connecting assemblies include first connecting pieces that are fixed to the lower end of the first connecting posts, the first connecting pieces are rectangular and arranged parallel to the seat frame assembly. The first bolt housings are attached at the sides of the first connecting pieces facing to the steering column assembly. Both sides of the first connecting pieces are connected to the two vertical first connecting plates by bolts through the first bolt housings. Two first connecting plates are positioned parallel with the inner sides facing each other symmetrically forming first accommodating cavities. The first accommodating cavities are shaped rectangularly, with its width corresponding to the length of the first connecting pieces, and the distance between two first accommodating cavities' bottom surfaces corresponds to the width of the first connecting pieces.

Additionally, the footrest assembly includes two footrest side-frames arranged in parallel and a footrest plate provided above the footrest side-frames. The distance between the two footrest side-frames corresponds to the distance between the two first connecting posts.

Additionally, the end of the footrest side-frames closer towards the seat frame assembly are angled upwards to form the vertical second connecting posts. On the upper end of second connecting posts are fixed the second connecting pieces, which are the dimensional equivalent of the first connecting pieces. The second bolt housings are attached at the sides of the second connecting pieces facing to the steering column assembly. Both sides of the second connecting pieces are connected to the two first connecting plates by bolts through the second bolt housings. The length of the first accommodating cavities corresponds to the sum of the lengths of the first connecting pieces and the second connecting pieces.

Additionally, below the footrest plate is a housing cavity, which contains an electric vehicle controller circuit board and a battery compartment. The electric vehicle controller circuit board and a battery are electrically connected to the front wheel assembly. There are openings for wiring attached to the battery to the side of the housing cavity, which is connected to the battery compartment.

Additionally, a non-slip mat is provided on the upper surface of the footrest plate.

Additionally, the steering column assembly includes the steering column bracket, with the centre of steering column bracket intersecting the steering column by means of an axle bearing in the centre of the steering column bracket. The lower end of the steering column is connected to the front wheel assembly through the bracket. The upper end of the steering column is connected to the steering handles. The ends of the steering column bracket are angled downwards and hinged on the footrest side-frames. The two ends of the steering column bracket are connected to two symmetrical and vertical clamping plates. The side of the clamping plates facing the vehicle's rear is a bevel. The lower end of the bevel of the clamping plates forms the clamping angles.

Optimally, between the two footrest side-frames, there is a horizontal supporting rod. The supporting rod is perpendicular to both footrest side-frames. Threaded onto the supporting rod are two clamping latches which correspond to the positions of the clamping plates. The side of the clamping latches which faces the clamping plates couples clamping angles with the clamping slots. The lower ends of the clamping latches are connected to compression springs, the other ends of which are connected to the footrest side-frames.

Additionally, an operation handle is attached on the seat frame assembly, the operation handle is connected to the upper end of the the clamping latches through a sleeved brake wire, and the sleeved brake wire is routed under the footrest plate.

Additionally, the steering column includes the upper steering column and the lower steering column, which are hinged through the second connecting assembly. The second connecting assembly includes the third connecting piece, which is fixed to the lower end of the upper steering column. The third connecting piece is rectangular and is perpendicular to the upper steering column. The side of the third connecting piece, which faces the seat frame assembly, is connected to the third bolt housing. Both sides of the third connecting piece are connected to the two vertical second connecting plates by the first limiting bolt through the third bolt housing. Two second connecting plates are positioned parallel with the inner sides facing each other symmetrically forming second accommodating cavities. The second accommodating cavity is shaped rectangularly, with its width corresponding to the length of the third connecting piece.

Optimally, the upper end of the lower steering column is fixed to the fourth connecting piece, which is the dimensional equivalent of the third connecting piece. The side of the fourth connecting piece, which is facing the seat frame assembly, is connected to the fourth bolt housing. Both sides of the fourth connecting piece are connected to the two vertical second connecting plates by the second limiting bolt through the fourth bolt housing. The length of the second accommodating cavities corresponds to the sum of the lengths of the third connecting piece and the fourth connecting piece.

Optimally, in one of the second accommodating cavities, there is a vertical rectangular limiting plate, where the length of the rectangular limiting plate corresponds to the length of the second accommodating cavity. Between the rectangular limiting plate and the second accommodating cavity, there is an expanding spring. The sum of the thickness of the rectangular limiting plate and the width of the third connecting piece is less than the distance between the lower edges of the two second accommodating cavities. The upper edge and lower edges of the rectangular limiting plate form the upper notch and the lower notch respectively. The lengths of the upper notch and the lower notch are equivalent and are both shorter than the width of the rectangular limiting plate. The width of the upper notch corresponds to the thickness of the third connecting piece. The width of the lower notch corresponds to the thickness of the fourth connecting piece.

Additionally, the side of the second connecting plate, which is facing the seat frame assembly, is intersected by the third limiting bolt. The third limiting bolt is parallel to the first limiting bolt and the second limiting bolt. On the bottom surface of the seat frame assembly, there is the first latch, which latches onto the footrest plate, and the second latch, which latches onto one of the first limiting bolt, the second limiting bolt, or the third limiting bolt. In the recess of the seat frame assembly, there is a front wheel positioning clip, which is composed of two vertical and parallel plates, where the ends of the plates flare outwards, away from each other. The distance between the two plates corresponds to the width of the front wheel assembly.

The invention discloses a draw-bar box-type quickly folding micro electric vehicle, which has the following benefits: the very low footrest assembly is hinged to the seat frame assembly by means of the first connecting assembly, so that the user does not need to raise their legs to use the vehicle. Thus, use of the vehicle is convenient and safety risks are reduced.

ATTACHED DRAWINGS' DESCRIPTIONS

Figure 1:
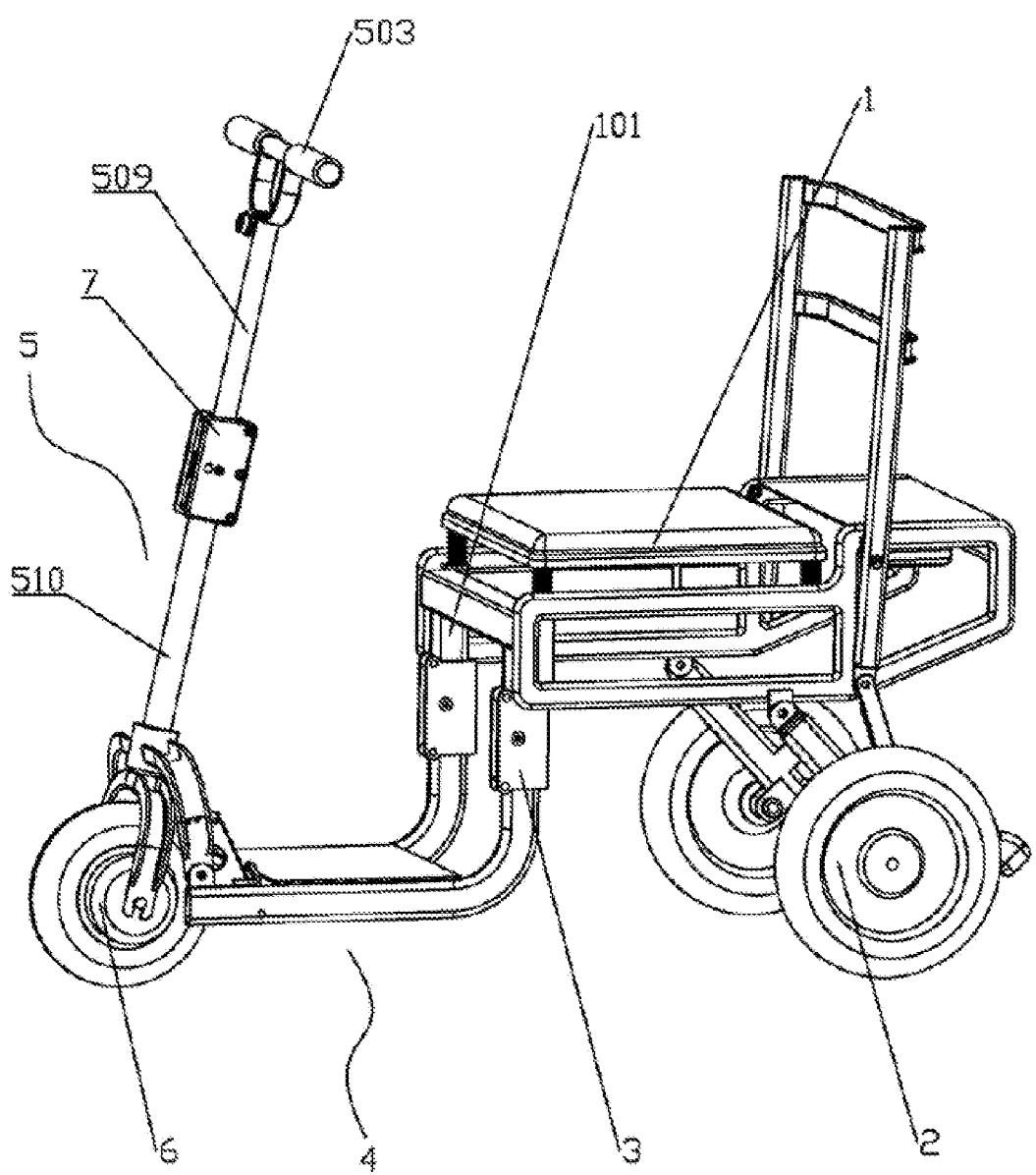
FIG. 1 is a schematic diagram of the working state of the invention.

ATTACHED DRAWINGS' REFERENCE
NUMBERS AND NAME (1) Seat frame assembly
   (101) First connecting post(s)
   (102) First latch
   (103) Second latch
   (104) Front wheel positioning clip
(2) Rear wheel assembly(ies)
(3) First connecting assembly(ies)
   (301) First connecting piece (s)
   (302) First bolt housing(s)
   (303) First connecting plate(s)
   (304) First accommodating cavity/(ties)
(4) Footrest assembly
   (401) Footrest side-frame(s)
   (402) Footrest plate
   (403) Second connecting post(s)
   (404) Second connecting piece (s)
   (405) Second bolt housing(s)
(5) Steering column assembly
   (501) Steering column bracket
   (502) Steering column
   (503) Steering handle(s)

(504) Clamping plate(s)
(505) Clamping angle(s)
(506) Supporting rod
(507) Clamping latch(es)
(508) Clamping slot(s)
(509) Upper steering column
(510) Lower steering column
(6) Front wheel assembly(ies)
(7) Second connecting assembly
  (701) Third connecting piece
  (702) Third bolt housing
  (703) First limiting bolt
  (704) Second connecting plate
  (705) Second accommodating cavity
  (706) Fourth connecting piece
  (707) Fourth bolt housing
  (708) Second limiting bolt
  (709) Rectangular limiting plate
  (710) Upper notch
  (711) Lower notch
  (712) Third limiting bolt

DETAILED DESCRIPTION

In order to explain the technical content, structural features, and achieved objectives and effects of the invention in detail, the following examples are given in conjunction with the accompanying drawings for a detailed description.

In the description of the invention, it will be understood that the terms "upper", "lower", "vertical", "horizontal", "top", "bottom", "inner", "outer", etc. which indicate the orientation or the positional relationship is based on the orientation or positional relationship as shown in the drawings. These descriptors are only for the convenience of describing the invention and simplifying the description, rather than indicating or implying that the device or element referred to must have a specific orientation or be constructed and operated in a specific orientation. Therefore, it cannot be understood as a limitation to the protection scope of the invention.

Figure 2:
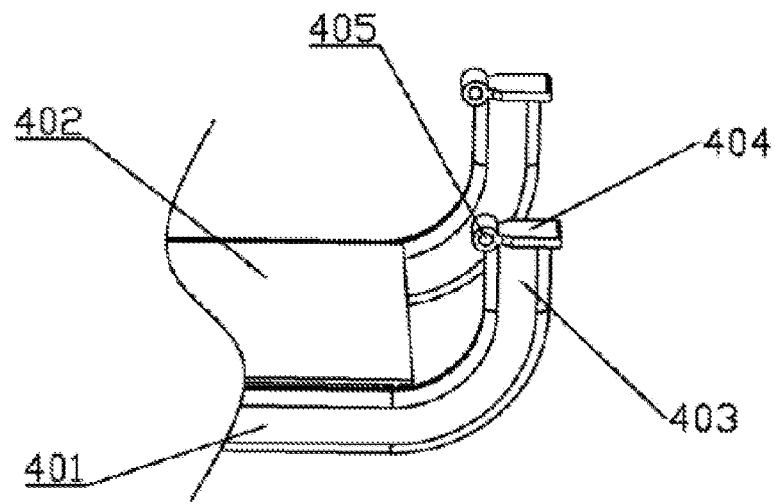
FIG. 2 is a schematic structural view of the footrest assembly of the invention.
Figure 3:
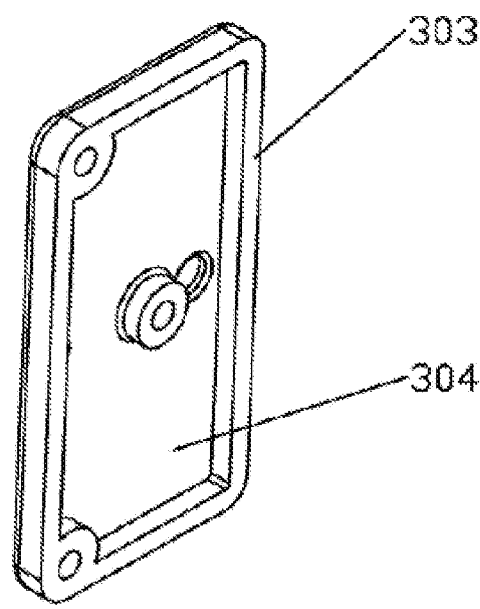
FIG. 3 is a schematic structural view of the first connecting plate of the invention.
Figure 4:
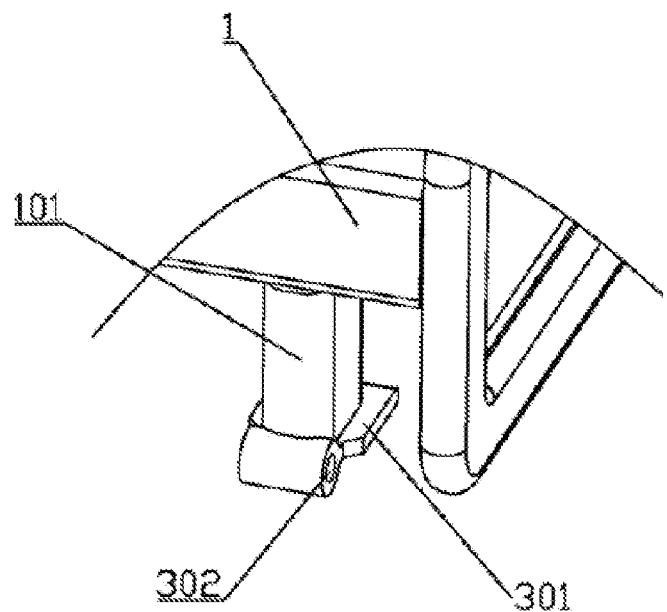
FIG. 4 is a schematic structural view of the first connecting post of the invention.
Figure 5:
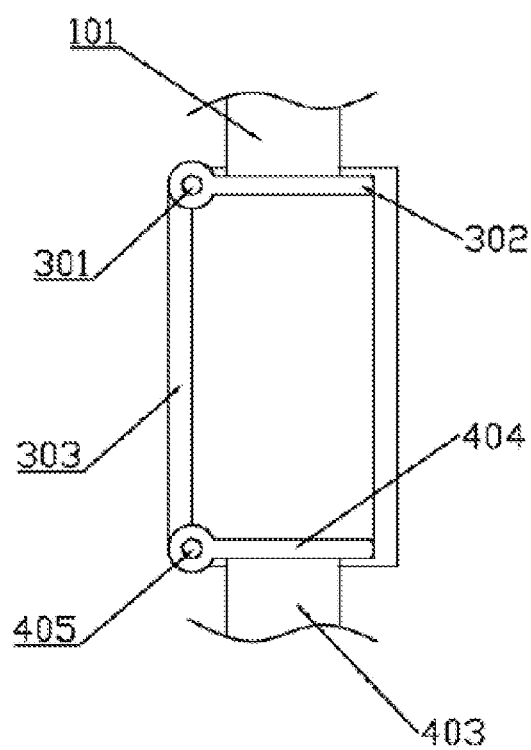
FIG. 5 is a schematic structural view I (working state) of the first connection assembly of the invention.
Figure 6:
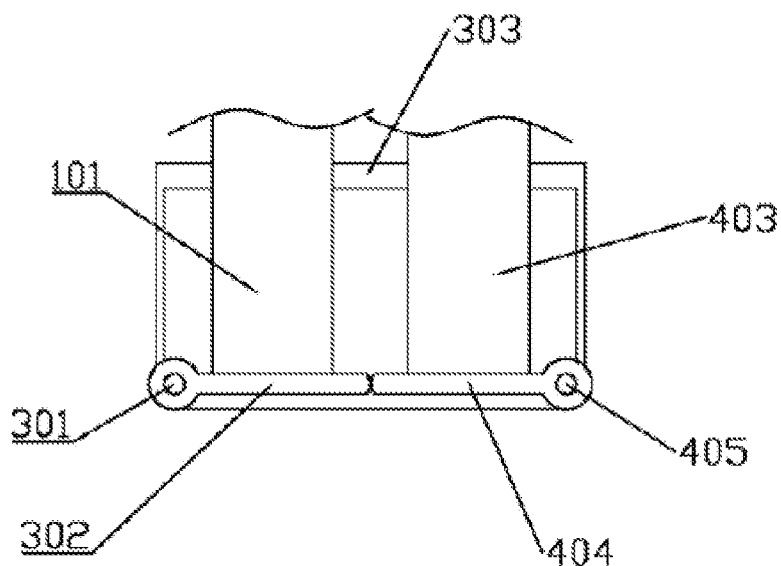
FIG. 6 is a schematic structural view II (collapsed state) of the first connection assembly of the invention.

As shown in FIG. 1 and FIG. 2, a draw-bar box-type quickly folding micro electric vehicle disclosed by the invention includes a seat frame assembly (1) arranged horizontally with a foldable backrest on the top surface. Two symmetrically arranged rear wheel assemblies (2) are provided at the rear of the lower end of the seat frame assembly (1). Two vertically downward first connecting posts (101) are provided near the front of the lower end of the seat frame assembly (1). A footrest assembly (4) is hinged to the lower ends of the two first connecting posts (101) through the first connecting assemblies (3). The footrest assembly (4) is arranged parallel to the seat frame assembly (1), the plane of the footrest assembly (4) is lower than the plane of the seat frame assembly (1). A steering column assembly (5) is hinged at the end of the footrest assembly (4) away from the seat frame assembly (1), and a front wheel assembly (6), with a power device, is attached at the lower end of the steering column assembly (5). The footrest assembly (4) includes two footrest side-frames (401) arranged in parallel and a footrest plate (402) provided above the footrest side-frames (401). The distance between the two footrest side-frames (401) corresponds to the distance between the two first connecting posts (101).

As shown in FIG. 2 to FIG. 6, the first connecting assemblies (3) include first connecting pieces (301) that are fixed to the lower end of the first connecting posts (101), the first connecting pieces (301) are rectangular and arranged parallel to the seat frame assembly (1). The first bolt housings (302) are attached at the sides of the first connecting pieces (301) facing towards the steering column assembly (5). Both sides of the first connecting pieces (301) are connected to the two vertical first connecting plates (303) by bolts through the first bolt housings (302). Two first connecting plates (303) are positioned parallel with the inner sides facing each other symmetrically forming first accommodating cavities (304).

The first accommodating cavities (304) are shaped rectangularly, with their width corresponding to the length of the first connecting pieces (301), and the distance between two first accommodating cavities' (304) bottom surfaces corresponds to the width of the first connecting pieces (301). The end of the footrest side-frames (401) closer towards the seat frame assembly (1) are angled upwards to form the vertical second connecting posts (403). On the upper end of second connecting posts (403) are fixed the second connecting pieces (404), which are the dimensional equivalent of the first connecting pieces (301). The second bolt housings (405) are attached at the sides of the second connecting pieces (404) facing to the steering column assembly (5). Both sides of the second connecting pieces (404) are connected to the two vertical first connecting plates (303) by bolts through the second bolt housings (405). The length of the first accommodating cavities (304) corresponds to the sum of the lengths of the first connecting pieces (301) and the second connecting pieces (404).

Below the footrest plate (402) is a housing cavity, which contains an electric vehicle controller circuit board and a battery compartment. The electric vehicle controller circuit board and a battery are electrically connected to the front wheel assembly (6). There are openings for wiring attached to the battery to the side of the housing cavity, which is connected to the battery compartment A non-slip mat (406) (which is not shown in the drawings) is provided on the upper surface of the footrest plate (402).

Figure 7:
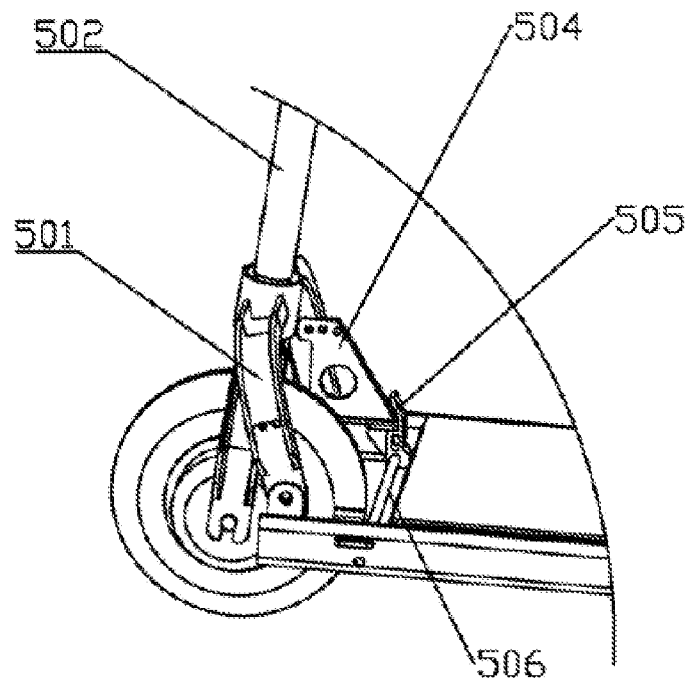
FIG. 7 is a schematic structural view of the steering column assembly of the invention.
Figure 8:
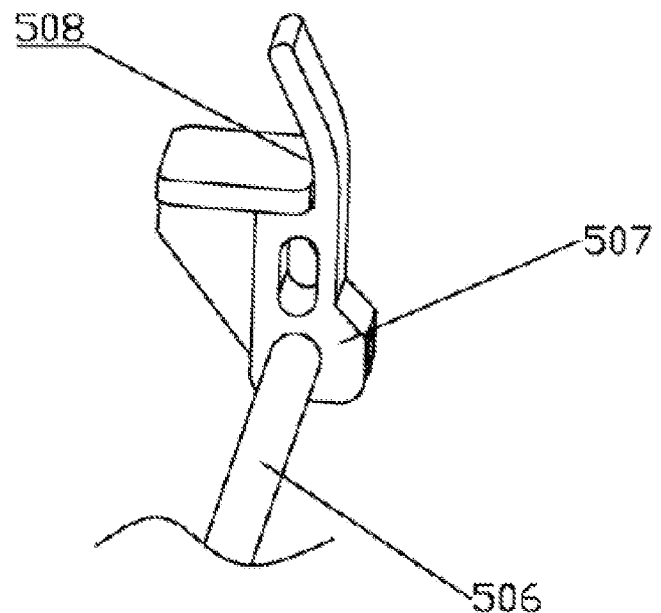
FIG. 8 is a schematic structural view of the clamp of the invention.

As shown in FIG. 7 and FIG. 8, the steering column assembly (5) includes the steering column bracket (501), with the centre of steering column bracket (501) intersecting the steering column (502) by means of an axle bearing in the centre of the steering column bracket (501). The lower end of the steering column (502) is connected to the front wheel assembly (6) through the bracket in the front wheel assembly (6). The upper end of the steering column (502) is connected to the steering handles (503). The ends of the steering column bracket (501) are angled downwards and hinged on the footrest side-frames (401). The two ends of the steering column bracket (501) are connected to two symmetrical and vertical clamping plates (504). The side of the clamping plates (504) facing the vehicle's rear is a bevel. The lower end of the bevel of the clamping plates (504) forms the clamping angles (505). Between the two footrest side-frames (401), there is a horizontal supporting rod (506). The supporting rod (506) is perpendicular to both footrest side-frames (401). Threaded onto the supporting rod (506) are two clamping latches (507) which correspond to the positions of the clamping plates (504). The side of the clamping latches (507) which faces the clamping plates (504) couples clamping angles (505) with the clamping slots (508). The lower ends of the clamping latches (507) are connected to compression springs, the other ends of which are connected to the footrest side-frames (401). An operation handle is attached on the seat frame assembly (1), the operation handle is connected to the upper end of the the clamping latches (507) through a sleeved brake wire (which is not shown in the drawings), and the sleeved brake wire is routed under the footrest plate (402).

Figure 9:
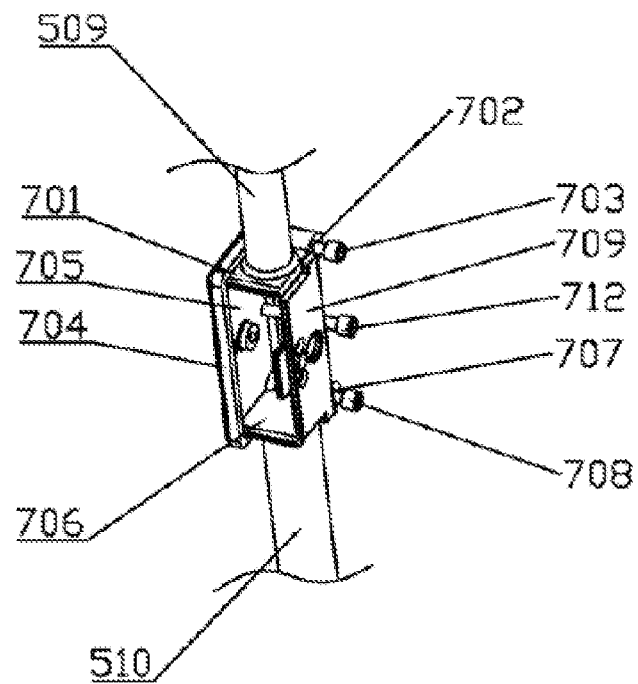
FIG. 9 is a schematic structural diagram of a second connecting assembly of the invention.

As shown in FIG. 1 and FIG. 9, the steering column (502) includes the upper steering column (509) and the lower steering column (510), which are hinged through the second connecting assembly (7). The second connecting assembly (7) includes the third connecting piece (701), which is fixed to the lower end of the upper steering column (509). The third connecting piece (701) is rectangular and is perpendicular to the upper steering column (509). The side of the third connecting piece (701), which is facing the seat frame assembly (1), is connected to the third bolt housing (702). Both sides of the third connecting piece (701) are connected to the two vertical second connecting plates (704) by the first limiting bolt (703) through the third bolt housing (702). Two second connecting plates (704) are positioned parallel with the inner sides facing each other symmetrically forming second accommodating cavities (705). The second accommodating cavity (705) is shaped rectangularly, with its width corresponding to the length of the third connecting piece (701). The upper end of the lower steering column (510) is fixed to the fourth connecting piece (706), which is the dimensional equivalent of the third connecting piece (701). The side of the fourth connecting piece (706), which faces the seat frame assembly (1), is connected to the fourth bolt housing (707). Both sides of the fourth connecting piece (706) are connected to the two vertical second connecting plates (704) by the second limiting bolt (708) through the fourth bolt housing (707). The length of the second accommodating cavities (705) corresponds to the sum of the lengths of the third connecting piece (701) and the fourth connecting piece (706).

In one of the second accommodating cavities (705), there is a rectangular limiting plate (709), where the length of the rectangular limiting plate (709) corresponds to the length of the second accommodating cavity (705). Between the rectangular limiting plate (709) and the second accommodating cavity (705), there is an expanding spring. The sum of the thickness of the rectangular limiting plate (709) and the width of the third connecting piece (701) is less than the distance between the lower edges of the two second accommodating cavities (705).

Figure 10:
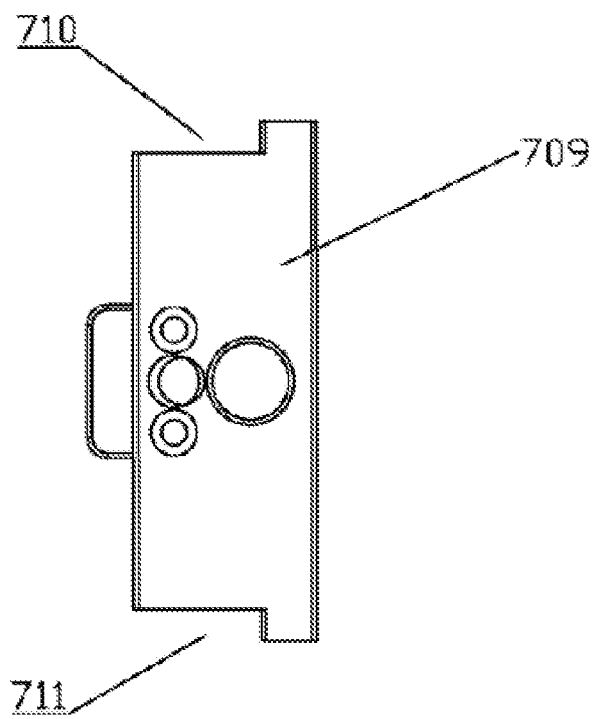
FIG. 10 is a schematic structural view of a rectangular limiting plate of the invention.

As shown in FIG. 10, the upper edge and lower edges of the rectangular limiting plate (709) form the upper notch (710) and the lower notch (711) respectively. The lengths of the upper notch (710) and the lower notch (711) are equivalent and are both shorter than the width of the rectangular limiting plate (709). The width of the upper notch (710) corresponds to the thickness of the third connecting piece (701). The width of the lower notch (711) corresponds to the thickness of the fourth connecting piece (706).

Figure 12:
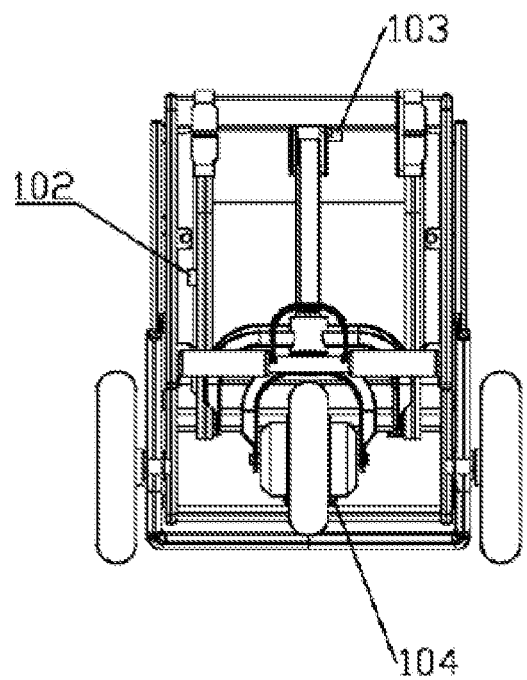
FIG. 12 is a schematic diagram II (bottom view) of the suitcase state of the invention.

Comparing FIG. 9 and FIG. 12, the side of the second connecting plate (704), which is facing the seat frame assembly (1), is intersected by the third limiting bolt (712). The third limiting bolt (712) is parallel to the first limiting bolt (703) and the second limiting bolt (708). On the bottom surface of the seat frame assembly (1), there is the first latch (102), which latches onto the footrest plate (402), and the second latch (103), which latches onto one of the first limiting bolt (703), the second limiting bolt (708), or the third limiting bolt (712).

Figure 13:
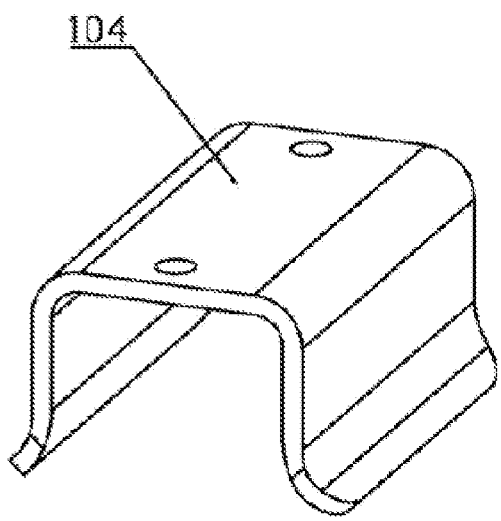
FIG. 13 is a schematic structural view of the front wheel securing clip of the invention.

As shown in FIG. 13, in the recess of the seat frame assembly (1), there is a front wheel positioning clip (104), which is composed of two vertical and parallel plates, where the ends of the plates flare outwards, away from each other. The distance between the two plates corresponds to the width of the front wheel assembly (6).

The Working Process of the Invention is as Follows:

The initial state is shown in FIG. 1. At this time, the user can ride directly and use the control handlebar to control the electric vehicle. The user does not need to lift their leg when getting on the vehicle, and the safety factor is high.

Figure 11:
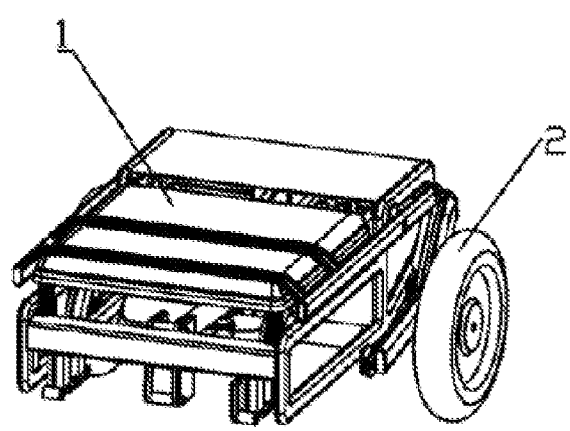
FIG. 11 is a schematic diagram I of the suitcase state of the invention.

When one does not need to ride, compare FIG. 1, FIG. 9, and FIG. 10, first, press (709) with one's thumb, turn (509) counterclockwise with respect to (7) (according to the viewing angle direction of FIG. 1), and, at this moment, (509) and (510) are right next to each other. Referring to FIG. 7 and FIG. 8, one should pull the upper end of (507) to the right until (505) is separated from (508). At this time, the other hand moves (509) and (510) to rotate clockwise together with respect to (501), then keep both (509) and (510) right next to (402). Continually referring to FIG. 1, turn (509), (510), and (402), as a whole, counterclockwise with respect to (3), and then store (509), (510), and (402) together under (1) (N.B. (6) is aligned with (104) to prevent the wheels from moving). Finally, (102) is used to latch onto (402), (103) is latched onto (7), and the state of the vehicle at this time is shown in FIG. 11, where the entire electric vehicle is folded.

Figure 14:
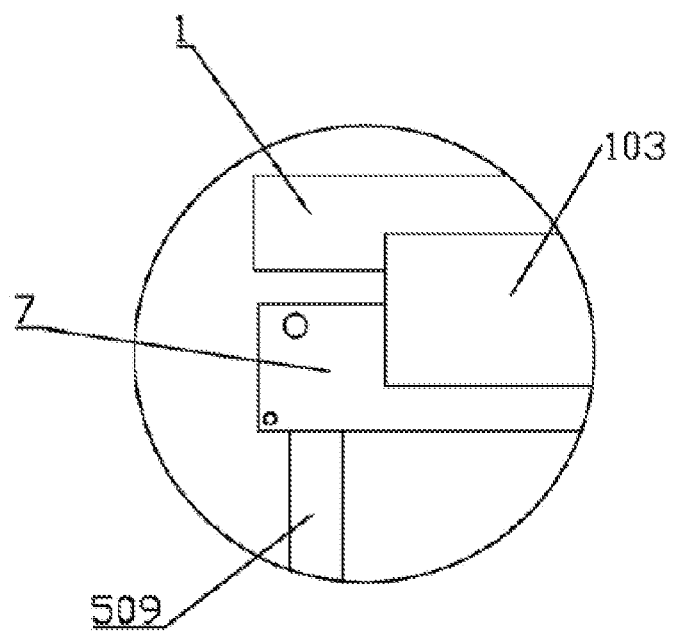
FIG. 14 is a schematic view I of the position of the second connecting assembly in the suitcase state of the invention.
Figure 15:
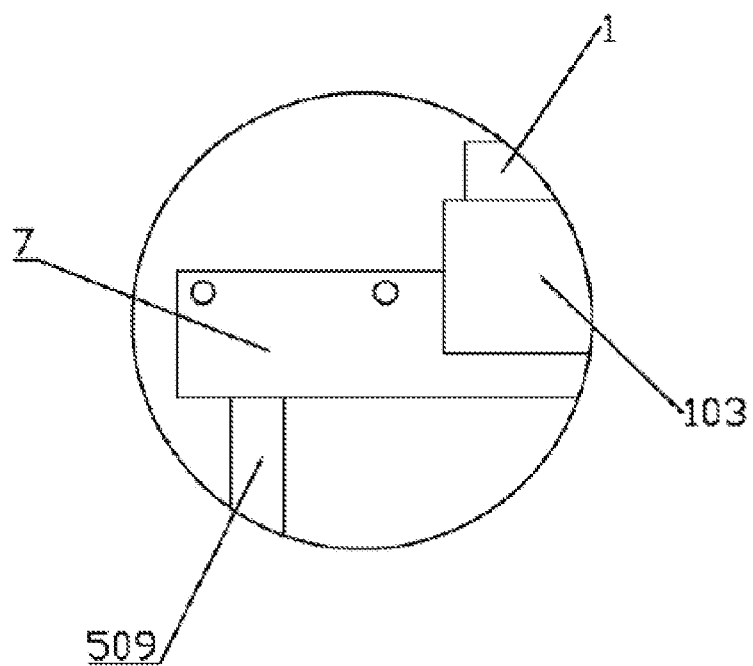
FIG. 15 is a schematic view II of the position of the second connecting assembly in the suitcase state of the invention.
Figure 16:
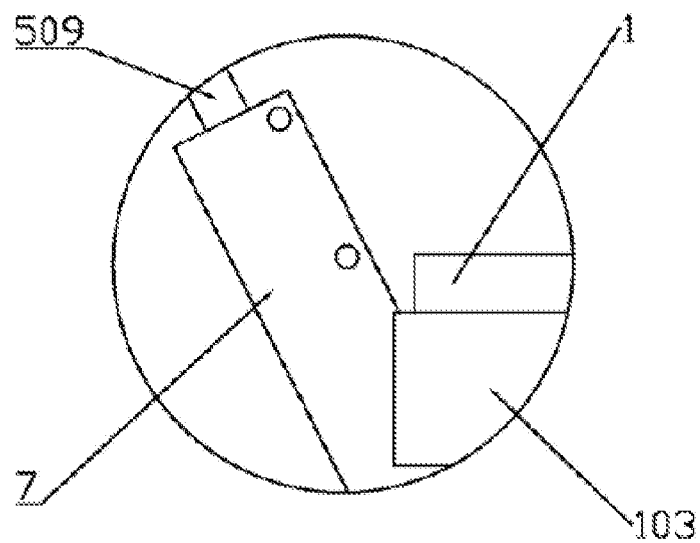
FIG. 16 is a schematic view III of the position of the second connecting assembly in the suitcase state of the invention.
Figure 17:
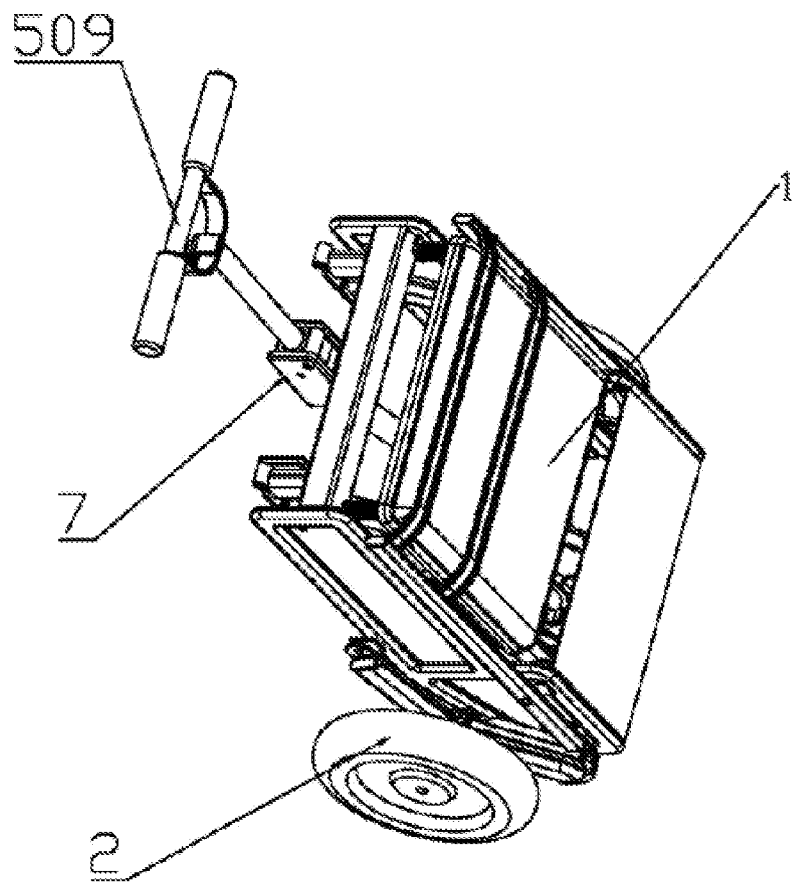
FIG. 17 is a schematic diagram of the state of the suitcase state (with handle unfolded) of the invention.

Referring to FIG. 14, since (103) is latched onto (712) on (7) ((712) is hidden by (103) in FIG. 14), (509) is physically blocked by (1), and (509) cannot rotate clockwise at this time; if one needs to drag the electric vehicle, one needs to first remove the restriction of (103), and drag (7) outward until (708) is restricted by (103), with the state of the vehicle at this time shown in FIG. 15. Then, turn (509) counterclockwise, and then rotate (7) upward, until (509) is pressed by (709) as shown in FIG. 16. At this time, the state of the entire electric vehicle is shown in FIG. 17, and the user can directly drag the electric vehicle by holding the operating handle to travel.

In summary, the above is only an exemplar working mechanism of the invention and does not limit the scope of protection of the invention. Any equivalent changes and modifications made according to the patent scope of the invention and the content of the description are within the scope covered by the invention patent

I claim:
1. A foldable electric-powered tricycle comprising:
a seat frame assembly arranged horizontally with a folding back on a top surface and two symmetrically arranged rear wheel assemblies provided at a rear of a lower end of the seat frame assembly;
two vertically downward first connecting posts provided near a front of the lower end of the seat frame assembly;
a footrest assembly is hinged to respective lower ends of the two first connecting posts by respective first connecting assemblies, wherein the footrest assembly is arranged parallel to the seat frame assembly and a plane of the footrest assembly is lower than a plane of the seat frame assembly;
a steering column assembly hinge connected to the footrest assembly at an end of the footrest assembly away from the seat frame assembly; and
a front wheel assembly, with a power device, is attached at a lower end of the steering column assembly,
wherein the first connecting assemblies include:
first connecting pieces that are fixed to the lower end of the respective first connecting posts, wherein the first connecting pieces are rectangular and arranged parallel to the seat frame assembly;

respective first bolt housings are attached at sides of the first connecting pieces facing towards the steering column assembly; and respective vertical first connecting plates connected to opposite sides of the first connecting pieces by bolts that extend through the first bolt housings;

wherein the two first connecting plates have respective inner sides facing each other symmetrically that define respective first accommodating cavities; and wherein the first accommodating cavities are shaped rectangularly and have a width corresponding to a length of the first connecting pieces and a distance between respective bottom surfaces of the two first accommodating cavities corresponds to a width of the first connecting pieces.

2. The foldable electric-powered tricycle of claim 1, wherein the footrest assembly includes two footrest side-frames arranged in parallel and a footrest plate provided above the footrest side-frames, wherein a distance between the two footrest side-frames corresponds to a distance between the two vertically downward first connecting posts.

3. The foldable electric-powered tricycle of claim 2, wherein:

respective ends of the footrest side-frames disposed closest to the seat frame assembly are angled upwards to form vertical second connecting posts and on an upper end of the second connecting posts are fixed respective second connecting pieces that are dimensionally equivalent of the first connecting pieces;

respective second bolt housings are attached at sides of the second connecting pieces that face towards the steering column assembly;

both sides of the second connecting pieces are connected to the respective first connecting plates by bolts that extend through the second bolt housings; and a length of the first accommodating cavities corresponds to the sum of a length of a first connecting piece and a length of a second connecting piece.

4. The foldable electric-powered tricycle of claim 3, wherein:

below the footrest plate is a housing cavity, which contains an electric vehicle controller circuit board and a battery compartment;

the electric vehicle controller circuit board and a battery are electrically connected to the front wheel assembly; and there are openings for wiring attached to the battery to a side of the housing cavity, which is connected to the battery compartment.

5. The foldable electric-powered tricycle of claim 4, wherein a non-slip mat is provided on an upper surface of the footrest plate.

6. The foldable electric-powered tricycle of claim 5, wherein:

the steering column assembly includes a steering column bracket and a steering column, with a centre of the steering column bracket receiving the steering column by means of an axle bearing in the centre of a steering column bracket;

a lower end of the steering column is connected to the front wheel assembly through the steering column bracket and an upper end of the steering column is connected to steering handles;

two ends of the steering column bracket are angled downwards and hinged on the footrest side-frames and the two ends of the steering column bracket are connected to two symmetrical and vertical clamping plates;

a side of the clamping plates facing the vehicle's rear is a bevel;

a lower end of the bevel of each of the clamping plates forms a clamping angle;

between the two footrest side-frames there is a horizontal supporting rod;

the supporting rod is perpendicular to both footrest side-frames;

threaded onto the supporting rod are respective clamping latches which correspond to positions of the clamping plates;

respective sides of the clamping latches which face the clamping plates couple the clamping angles with respective clamping slots; and lower ends of the clamping latches are connected to respective compression springs that each have an end connected to a respective said footrest side-frame.

7. The foldable electric-powered tricycle of claim 6, wherein an operation handle is attached on the seat frame assembly, the operation handle is connected to respective upper ends of the clamping latches through a sleeved brake wire, and the sleeved brake wire is routed under the footrest plate.

8. The foldable electric-powered tricycle of claim 6, wherein:

the steering column includes an upper steering column and a lower steering column, which are hinged through a second connecting assembly;

the second connecting assembly includes a third connecting piece, which is fixed to a lower end of the upper steering column;

the third connecting piece is rectangular and is perpendicular to the upper steering column;

the third connecting piece has a first side and a second side and said first side, which faces the seat frame assembly, is connected to a third bolt housing;

said first and second sides of the third connecting piece are connected to respective vertical second connecting plates by a first limiting bolt through the third bolt housing;

the second connecting plates are positioned parallel with respective inner sides thereof facing each other symmetrically to form second accommodating cavities;

the second accommodating cavities are shaped rectangularly and have a width corresponding to a length of the third connecting piece;

an upper end of the lower steering column is fixed to a fourth connecting piece, which is the dimensional equivalent of the third connecting piece;

a side of the fourth connecting piece, which is facing the seat frame assembly is connected to a fourth bolt housing;

respective side of the fourth connecting piece are connected to the two vertical second connecting plates by a second limiting bolt through the fourth bolt housing;

the second accommodating cavities each have a length that corresponds to the sum of a length of the third connecting piece and a length of the fourth connecting piece;

in one of the second accommodating cavities there is a vertical rectangular limiting plate having a length that corresponds to the length of the second accommodating cavity;

between the rectangular limiting plate and the second accommodating cavity there is an expanding spring;

the rectangular limiting plate has a thickness and the third connecting piece has a width and the sum of the thickness of the rectangular limiting plate and the width of the third connecting piece is less than a distance between respective lower edges of the two second accommodating cavities;

an upper edge and a lower edge of the rectangular limiting plate are provided with an upper notch and a lower notch respectively;

respective lengths of the upper notch and the lower notch are equivalent and are both shorter than a width of the rectangular limiting plate;

a width of the upper notch corresponds to a thickness of the third connecting piece; and a width of the lower notch corresponds to a thickness of the fourth connecting piece.

9. The foldable electric-powered tricycle of claim 8, wherein:

a side of the second connecting plate facing the seat frame assembly is intersected by the third limiting bolt;

the third limiting bolt is parallel to the first limiting bolt and the second limiting bolt;

on a bottom surface of the seat frame assembly there is a first latch, which latches onto the footrest plate and a second latch, which latches onto one of the first limiting bolt, the second limiting bolt, or the third limiting bolt;

in a recess of the seat frame assembly there is a front wheel positioning clip, which is composed of two vertical and parallel clip plates that have respective ends that flare outwards away from each other; and a distance between the two clip plates corresponds to a width of the front wheel assembly.

\* \* \* \* \*